United States Patent [19]

Suzuki et al.

[11] Patent Number: 5,479,817
[45] Date of Patent: Jan. 2, 1996

[54] SPARK PLUG WITH BUILT-IN PRESSURE SENSOR

[75] Inventors: Takahiro Suzuki; Kouji Okazaki, both of Nagoya, Japan

[73] Assignee: NGK Spark Plug Co., Ltd., Aichi, Japan

[21] Appl. No.: 431,465

[22] Filed: May 1, 1995

Related U.S. Application Data

[63] Continuation of Ser. No. 79,752, Jun. 22, 1993, abandoned.

[30] Foreign Application Priority Data

Jul. 28, 1992 [JP] Japan ................................ 4-219604

[51] Int. Cl.$^6$ ..................................................... H01T 13/40
[52] U.S. Cl. ........................ 73/115; 123/143 C; 313/118
[58] Field of Search ............................... 313/118; 73/115; 123/143 C

[56] References Cited

U.S. PATENT DOCUMENTS

| | | | |
|---|---|---|---|
| 4,169,388 | 10/1979 | Teitelbaum et al. | 73/714 |
| 4,566,316 | 1/1986 | Takeuchi | 73/754 |
| 4,686,861 | 8/1987 | Morii | 73/862.68 |
| 4,881,403 | 11/1989 | Kagawa et al. | 73/115 |
| 4,898,024 | 2/1990 | Takeuchi | 73/115 |
| 4,909,071 | 3/1990 | Amano et al. | 73/115 |
| 4,984,905 | 1/1991 | Amano et al. | 374/143 |
| 5,146,882 | 9/1992 | Brinkman et al. | 123/179.5 |
| 5,218,936 | 6/1993 | Pritz et al. | 123/143 C |
| 5,323,643 | 6/1994 | Kojima et al. | 73/115 |
| 5,329,809 | 7/1994 | Sellnau et al. | 73/115 |
| 5,353,633 | 10/1994 | Benedikt et al. | 73/115 |

FOREIGN PATENT DOCUMENTS

| | | | |
|---|---|---|---|
| 52-30790 | 7/1987 | Japan . | |
| 63-171988 | 11/1988 | Japan | H01T 13/40 |
| 254637 | 11/1990 | Japan . | |

*Primary Examiner*—Donald J. Yusko
*Assistant Examiner*—Lawrence D. Richardson
*Attorney, Agent, or Firm*—Evenson, McKeown, Edwards & Lenahan

[57] ABSTRACT

A spark plug is provided with a built-in, ring-shaped pressure sensor. The pressure sensor is composed of a plate packing, a piezoelectric element, an electrode plate and an insulating plate stacked one over the other and also includes a lead wire extending from the electrode plate through a through-hole formed in an upper part of a base portion of a metal shell to output electrical signals. The pressure sensor is accommodated in a cylindrical metal casing of L-shaped cross-section and disposed above a gasket and on the base portion. The metal casing is integrally welded over an entire circumference thereof to the base portion at an upper edge and also at a lower edge, whereby the pressure sensor is sealed within the metal casing.

7 Claims, 2 Drawing Sheets

SPARK PLUG WITH BUILT-IN PRESSURE SENSOR

This application is a continuation of application Ser. No. 08/079,752, filed on Jun. 22, 1993 now abandoned.

BACKGROUND OF THE INVENTION

1. Field of the Invention

This invention relates to a spark plug with a built-in pressure sensor, which is to be fitted in an internal combustion engine. In particular, this invention is concerned with a watertight structure for the accommodation of a pressure sensor disposed in a base portion of a metal shell of the spark plug.

2. Description of the Related Art

Coupled with the recent move toward internal combustion engines of higher performance, there is an outstanding demand for the maintenance of accurate ignition timing during high-speed and high-compression operation. With a view to achieving accurate ignition timing for each combustion chamber of an internal combustion engine and hence ideal combustion there, it has been proposed to provide a spark plug, which is to be fitted in the combustion chamber, with a built-in pressure sensor so that detection of knocking or the like inside the combustion engine can be utilized to control the ignition timing [Japanese Utility Model Publication (Kokoku) No. SHO 60-30790 published on Aug. 7, 1987]. In the spark plug with the built-in pressure sensor, each signal which has been generated by a piezoelectric element of the pressure sensor is outputted via an electrode plate or the like upon transmission of the signal to a central processing unit (CPU) to control the ignition timing or the like. The pressure sensor itself is therefore required to have a high degree of watertightness. To attain such a high degree of watertightness, some spark plugs have been proposed accordingly, including a spark plug in which a pressure sensor is accommodated in a metal casing and the metal casing with the pressure sensor built therein is joined and fixed on a base portion of a metal shell by seam welding [Japanese Utility Model Application Laid-Open (Kokai) No. SHO 63-171988 laid open on Nov. 9, 1988] and a spark plug in which a pressure sensor is sealed together with a molding material such as a resin within a metal casing and the metal casing is fixed via a flanged ring joined and fixed on a metal shell by seam welding [Japanese Patent Publication (Kokoku) No. HEI 2-54637 published on Nov. 22, 1990].

Where a pressure sensor is accommodated in a metal casing and the metal casing with the pressure sensor accommodated therein is joined and fixed on a base portion of a metal shell by seam welding as in Japanese Utility Model Application Laid-Open (Kokai) No. SHO 63-171988 or where a pressure sensor is sealed together with a molding material such as a resin within a metal casing and the metal casing is fixed via a flanged ring joined and fixed on a metal shell by seam welding as in Japanese Patent Publication (Kokoku) No. HEI 2-54637, it is only at an opening for a lead wire that the interior of the metal casing in which the pressure sensor composed of a piezoelectric element, etc. is accommodated is communicated with the outside. Accordingly, the watertightness of the metal casing with the pressure sensor accommodated therein is fully assured. The construction of the pressure sensor itself, however, becomes complex and the efficiency of production work is lowered, leading to the drawback that the above construction is very disadvantageous for the production of spark plugs produced in a large quantity.

SUMMARY OF THE INVENTION

An object of the present invention is therefore to improve the above-described drawback of the conventional spark plugs and to provide a spark plug with a built-in pressure sensor having excellent watertightness.

In one aspect of the present invention, there is thus provided a spark plug with a built-in pressure sensor. The pressure sensor is in the form of a ring, is accommodated in a cylindrical metal casing of L-shaped cross-section, and is disposed above a gasket and on a base portion of a metal shell fixedly supporting an insulator thereon. The pressure sensor has a lead wire which extends out upwardly through a through-hole formed in the metal shell to output electrical signals. The metal casing is integrally welded over an entire circumference thereof to the base portion on a side of a lower edge of the metal casing and also on a side opposite to the lower edge relative to the pressure sensor.

The metal casing can be integrally welded over the entire circumference thereof to the base portion at the lower edge and also at an upper edge thereof. Alternatively, the pressure sensor can be located on the side of the lower edge of the metal casing below a longitudinal intermediate portion of the metal casing, and the metal casing can be integrally welded over the entire circumference thereof to the base portion at the lower edge thereof and also at the intermediate portion. The integral welding between the metal casing and the base portion is conducted preferably by laser welding or electron beam welding.

The through-hole is preferably filled with a heat-resistant resin such as a silicone, fluorosilicone or epoxy resin, whereby the pressure sensor is sealed within the metal casing. The pressure sensor may comprise a plate packing, a piezoelectric element, an electrode plate with the lead wire connected thereto, and an insulating plate, all stacked one over the other.

As the spark plug according to the present invention is constructed as described above, the pressure sensor can be disposed in the below-described manner on the base portion of the metal shell which forms the spark plug. The through-hole through which the lead wire is to extend is formed in the metal shell. A main body of the pressure sensor, said main body being formed of the plate packing, the piezoelectric element, the electrode plate with the lead wire connected thereto, and the insulating plate stacked one over the other is provided. The lead wire is then upwardly inserted into the through-hole. The main body is accommodated and held in the ring-shaped metal casing of L-shaped cross-section and is then integrally joined, for example, by laser welding or electron beam welding over the entire circumference thereof to the base portion on the side of the lower edge of the metal casing and also on a side opposite to the lower edge relative to the pressure sensor. It is therefore only the through-hole formed through the metal shell and having the lead wire extending therethrough that could have the potential danger of permitting penetration of water or the like into the metal casing in which the pressure sensor main body is accommodated and held. The above construction can therefore substantially prevent penetration of water or the like so that the watertightness of the metal casing enclosing the pressure sensor main body accommodated and held therein can be sufficiently maintained.

Further, the filling and sealing of the through-hole with the heat-resistant resin such as a silicone, fluorosilicone or epoxy resin can still improve the maintenance of watertightness of the metal casing.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE PREFERRED EMBODIMENTS

Figure 1:
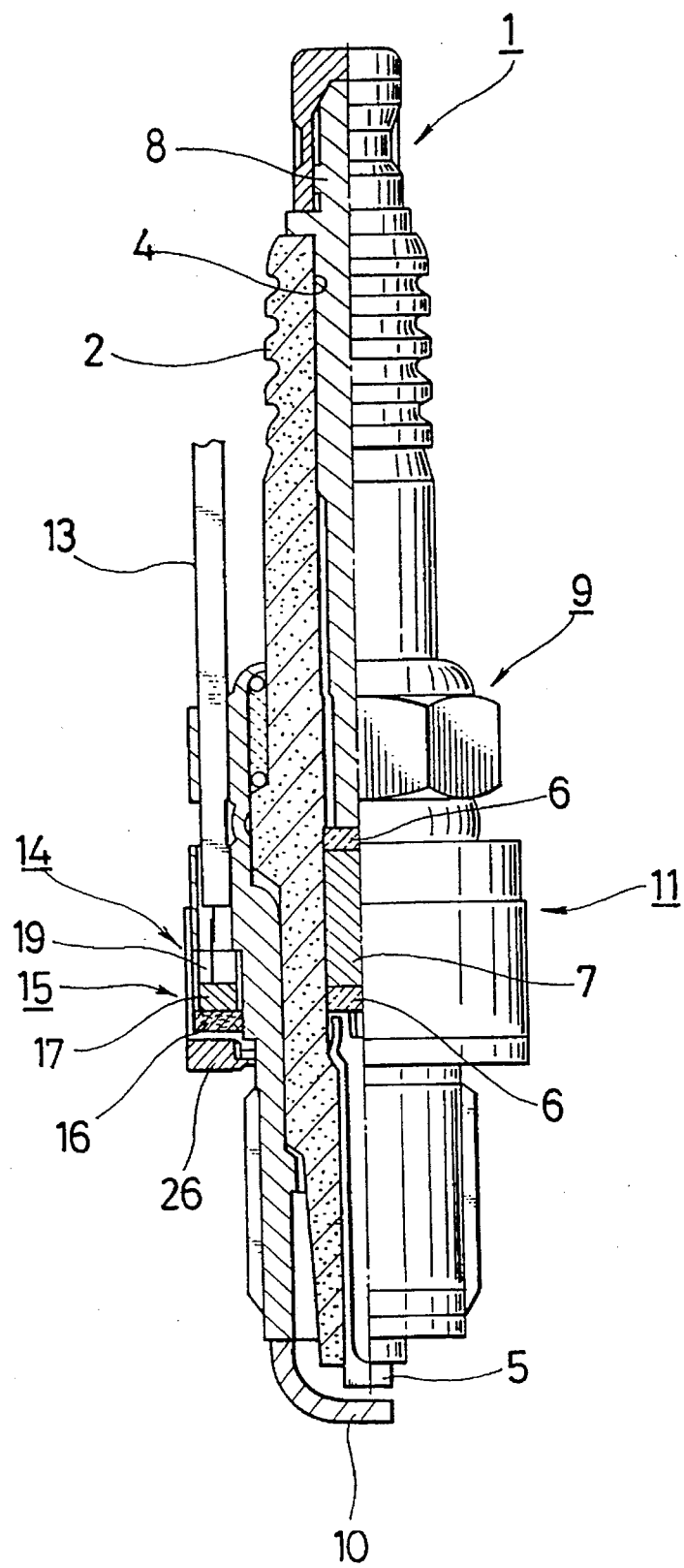
FIG. 1 is a partly cross-sectional view of a spark plug according to a first embodiment of the present invention, said spark plug having a pressure sensor built therein.
Figure 2:
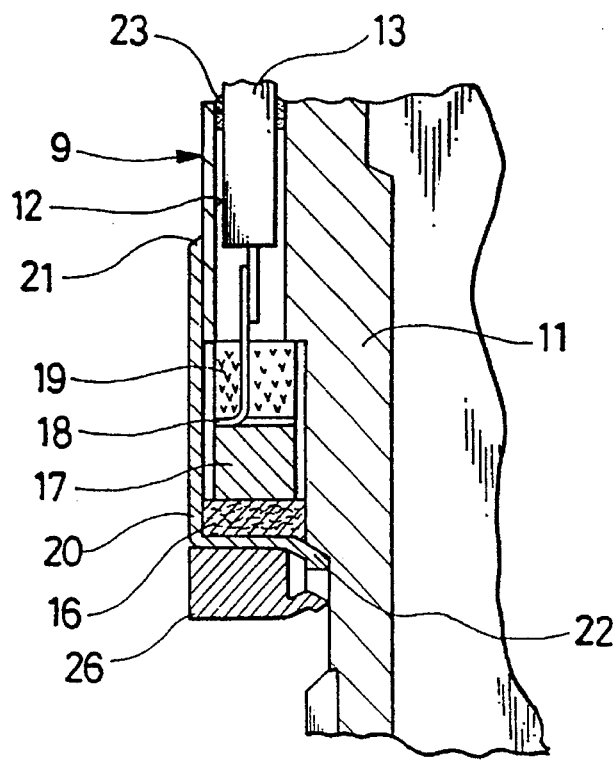
FIG. 2 is an enlarged, fragmentary cross-sectional view of the spark plug with the built-in pressure sensor.

The first embodiment of the present invention will now be described with reference to FIGS. 1 and 2. The spark plug with the built-in pressure sensor, which is designated at numeral 1, is constructed of an insulator 2 and a metal shell 9 fixedly holding the insulator 2 therein. The insulator 2 defines an axial bore 4 therethrough. A center electrode 5 is held in an inner end portion of the axial bore 4. A resistor 7 is accommodated in an intermediate portion of the axial bore 4, and opposite ends of the resistor 7 are held by conductive glass seals 6, respectively. A terminal electrode 8 is inserted in an outer end portion of the axial bore 4 and is held by one of the conductive glass seals 6. The metal shell 9 carries at an inner end thereof a ground electrode 10 which extends to a position opposite to a free end of the center electrode 5 held by the insulator 2. The pressure sensor which is designated at numeral 14 and in the form of a ring is disposed on a base portion 11 of the metal shell 9 and is connected to a lead wire 13 extending through a through-hole 12 which is formed through an upper part of the base portion 11.

The pressure sensor 14 is located above a gasket 26 and comprises a pressure sensor main body 15 constructed of a plate packing 16, a piezoelectric element 17, an electrode plate 18 with the lead wire 13 connected thereto so as to output electrical signals, and an insulating plate 19, all stacked one over the other and held in a cylindrical metal casing 20 of L-shaped cross-section. The metal casing 20 with the pressure sensor main body 15 held therein is integrally joined over an entire circumference thereof to the base portion 11 of the metal shell 9 at an upper and lower edges 21,22 of the metal casing 20 by laser welding, electron beam welding or the like.

The through-hole 12 through which the lead wire 13 extends is filled and sealed with a heat-resistant resin 23 such as a silicone, fluorosilicone or epoxy resin.

To dispose the pressure sensor 14 on the base portion 11 of the metal shell 9, the through-hole 12 is formed in the base portion 11. The lead wire 13 of the pressure sensor main body 15—which is formed of the plate packing 16, the piezoelectric element 17, the electrode plate 18 with the lead wire 13 connected thereto, and the insulating plate 19 stacked one over the other—is inserted upwardly into the through-hole 12. The pressure sensor main body 15 is then accommodated and held in the ring-shaped metal casing 20 of L-shaped cross-section. The metal casing 20 is then integrally joined over the entire circumference thereof to the base portion 11 at the upper and lower edges 21,22 by laser welding, electron beam welding or the like. As a consequence, it is only the through-hole 12 formed in the metal shell 9 and carrying the lead wire 13 extending therethrough that could become an opening for the penetration of water or the like into the metal casing 20 with the pressure sensor main body 15 accommodated and held therein. Penetration of water or the like can therefore be substantially prevented so that the watertightness of the metal casing 12 can be maintained sufficiently.

Filling and sealing of the through-hole 12 with the heat-resistant resin 23 can further improve the watertightness of the metal casing 20.

Figure 3:
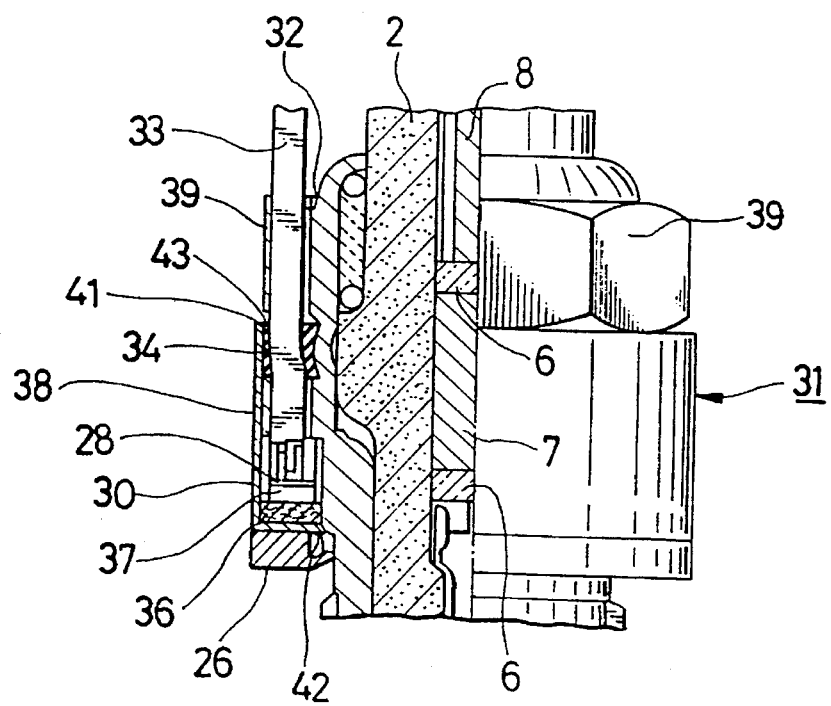
FIG. 3 is an enlarged, fragmentary cross-sectional view of a spark plug according to a second embodiment of the present invention, said spark plug having a pressure sensor built therein.

The second embodiment of the present invention will next be described with reference to FIG. 3. As is shown in FIG. 3, a pressure sensor main body is constructed of a plate packing 36, a piezoelectric element 37, an electrode plate 28 with a lead wire 33 connected thereto, and the like, all stacked one over the other. A metal casing 30 with the pressure sensor main body accommodated therein extends upwardly along an axis of the spark plug 1 (see FIG. 1), whereby a space 34 is formed between the metal casing 30 and a side wall of a base portion 31 of a metal shell 39. A potting 43 of a heat-resistant resin such as a silicone, fluorosilicone or epoxy resin is applied to the space 34 along an upper edge 41 of the metal casing 30. This construction makes it possible to maintain watertightness at still lower cost. Incidentally, the metal casing 30 is welded over an entire circumference thereof to the base portion 31 of the metal shell 39 at both a lower edge 42 and an intermediate portion 38 of the metal casing 30. As in the first embodiment depicted in FIGS. 1 and 2, the lead wire 33 of the pressure sensor extends upwardly through the through-hole 32 formed in the metal shell 39.

What is claimed is:

1. In a spark plug with a built-in pressure sensor, said pressure sensor being in the form of a ring, enclosed in a cylindrical metal casing of L-shaped cross-section and disposed above a gasket and on a base portion of a metal shell fixedly supporting an insulator thereon, said pressure sensor having a lead wire extending out upwardly through a through-hole formed in said metal shell to output electrical signals, the improvement wherein said metal casing is integrally welded over an entire circumference thereof to said base portion at a lower end edge thereof and also on a side opposite to said lower edge relative to said pressure sensor, wherein said pressure sensor comprises a plate packing, a piezoelectric element, an electrode plate with the lead wire connected thereto, and an insulating plate, all stacked one over the other.

2. A spark plug according to claim 1, wherein said metal casing is integrally welded over the entire circumference thereof to said base portion at the lower edge and also at an upper edge thereof.

3. A spark plug according to claim 1, wherein said pressure sensor is located on the side of a lower edge of said metal casing below a longitudinal intermediate portion of said metal casing, and said metal casing is integrally welded over the entire circumference thereof to said base portion at the lower edge thereof and also at said intermediate portion.

4. A spark plug according to claim 1, wherein said metal casing is integrally joined to said base portion by laser welding.

5. A spark plug according to claim 1, wherein said metal casing is integrally joined to said base portion by electron beam welding.

6. A spark plug according to claim 1, wherein said through-hole is filled with a heat-resistant resin, whereby said pressure sensor is sealed within said metal casing.

7. A spark plug according to claim 1, wherein said heat-resistant resin is selected from the group consisting of silicone resins, fluorosilicone resins and epoxy resins.

* * * * *